United States Patent [19]
Lingart et al.

[11] Patent Number: 5,900,202
[45] Date of Patent: May 4, 1999

[54] METHOD FOR MAKING GLASS SILICATE TILES

[76] Inventors: Youri Lingart; Marina Lingart; Stanislav Lingart, all of Krymska 19 101 10, Prague 10, Czech Rep.

[21] Appl. No.: 08/938,728

[22] Filed: Sep. 26, 1997

[51] Int. Cl.⁶ .............................. D04H 1/16; B29C 67/00
[52] U.S. Cl. ............................................ 264/113; 264/125
[58] Field of Search ..................................... 264/113, 125

[56] References Cited

U.S. PATENT DOCUMENTS

| | | | |
|---|---|---|---|
| 3,425,577 | 2/1969 | Copley | 264/125 |
| 3,432,580 | 3/1969 | Heidrich | 264/125 |
| 3,950,470 | 4/1976 | Davidovits | 264/113 |

*Primary Examiner*—Christopher A. Fiorilla
*Attorney, Agent, or Firm*—Ilya Zborovsky

[57] ABSTRACT

A method of making glass-silicate tiles includes pouring an input raw material containing glass granulate into a heat-proof mold, wetting the input raw material and making an initial blank thereby, heat treating of the blank by gradual heating and by gradual cooling by stages with holding period between the stages wherein a first heating stage is performed predominantly by heating a bottom side of the blank with higher speed of heating of a lowering layer than of an upper layer of the blank to accelerate gases to release the blank through the upper layer up to reach of the temperature of beginning of glass granulate sintering ($T_f$) in the lower layer, and the temperature not exceeding a glass granulate transformation temperature ($T_g$) in the upper layer, a first holding period at these condition to expel generated gases, and heating the upper layer with higher speed than the lower layer until a Littleton temperature is reached in the lower layer.

27 Claims, 6 Drawing Sheets

METHOD FOR MAKING GLASS SILICATE TILES

BACKGROUND OF THE INVENTION

The present invention relates to a method and an apparatus for making glass silicate tiles.

One of such methods is disclosed in patent application PV-2751-93 of Czech Republic. In this reference flat glass silicate tiles are produced from sand and glass wastes by heating a work piece located in a refractory mode to a temperature which is equal to an average value between the temperature of the beginning of sintering and the Littleton temperature. Thereafter the workpiece is subjected to a thermal shock, and successive cooling in several stages. The process is performed in a multi-chamber furnace with electrical heating, and the temperature in the successive chambers is maintained in accordance with the properties of the glass granulate used in the workpiece.

This method has the disadvantages that the heating of the workpiece is performed from the surface, and during the process of thermal shock gas inclusions remain in the lower layers. They reduce strength of the tiles on the one hand, and can migrate to the surface on the other hand and distort the decorative layer by forming crates on its surface. It is therefore believed that it is advisable to improve the above mentioned existing method.

SUMMARY OF THE INVENTION

Accordingly, it is an object of present invention to provide a method and an apparatus for making glass-silicate tile which avoids the disadvantages of the prior art.

In keeping with these objects and with others which will become apparent hereinafter, one feature of the present invention resides, briefly stated in a method of making glass silicate tiles which has the following steps pouring an input raw material containing glass granulate into a heat-proof mold, wetting the input raw material and making an initial blank thereby, heat treating of the blank by gradual heating and by gradual cooling by stages with holding period between the stages wherein a first heating stage is performed predominantly by heating a bottom side of the blank with higher speed of heating of a lowering layer than of an upper layer of the blank to accelerate gases to release the blank through the upper layer up to reach of the temperature of beginning of glass granulate sintering ($T_f$) in the lower layer, and the temperature not exceeding a glass granulate transformation temperature ($T_g$) in the upper layer, a first holding period at these condition to expel generated gases, and heating the upper layer with higher speed than the lower layer until a Littleton temperature is reached in the lower layer.

In accordance with another embodiment of the inventive method, the method includes the following steps creating of an initial blank by pouring an initial raw material containing glass granulate into a heat-proof mold and its consolidation; gradual heating the blank with holding periods between stages comprising following stages: a first stage of heating, predominantly from bottom of the blank with lower layer heating temperature higher than the temperature of upper layer to accelerate gas removal through the upper surface layer until a glass granulate sintering temperature is reached in the lower layer, a first holding period at these sintering temperature is reached in the lower layer, a first holding period at these conditions to expel generated gases, heating the upper layer with higher speed than the lower layer until a Littleton temperature is reached in the lower layer and sintering temperature is reached in the upper layer and having a second holding period with these conditions, during the second holding period pressing the blank by a gas permeable press, after which additionally heating the blank until the upper layer reaches a temperature $T_{4,5}$ corresponding to the glass granulate viscosity logarithm 4.5 Pa.s, under which the third holding period is realized until the lower layer reaches a temperature $T_{5,5}$ on which a glass granulate viscosity logarithm is equal to 5.5 Pa.s; after the third holding period the blank is cooled with holding periods between the following stages; a first stage of accelerated cooling is realized until the blank surface reaches a temperature $T_L$, which is followed by a holding period for the period of time sufficient to achieve the Littleton temperature in the lower layer; after the first holding period a second cooling stage is performed until the annealing temperature is reached, after which a second holding period ensures a product annealing; after the first annealing a third cooling stage is realized until the surface reaches a temperature $T_{13,5}$ on which the melt viscosity logarithm is equal to 13.5 Pa.s, after which the product is annealed, and after the second annealing, cooled down to the room temperature.

In accordance with the present invention also an apparatus is proposed which has a transport system for location and transportation of heat-proof molds having bottom parts; the heat-proof molds are arranged on the transport system with a gap between the transport system and bottom part of the mold and means for heat treating glass-silicate tiles comprising following modules being lined up in the process flow; a module for input raw material filling into the heat-proof molds for formation blanks therein, a module of gradual heating of the blanks with holding periods between stages having a pre-heating chamber and heat stress chamber; a module of gradual cooling blanks including modules of inter-stage holding and annealing; wherein each of the heating and cooling modules is equipped with insulation walls and a roof wherein gas burners are installed in the side walls of the pre-heating chamber, while the burner height from the floor corresponds to the height of the gap between the upper surface of the transport system and bottom part of the heat-proof molds, and gas flame cone of the gas burners is located in the gap; gas exhaust channels are located in the side walls and roof of the pre-heating chamber; the heat-proof molds with the blanks located in them are moving continuously with transport unit through the above modules ensuring gradual heat treatment of input product and production of the glass-silicate tiles.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
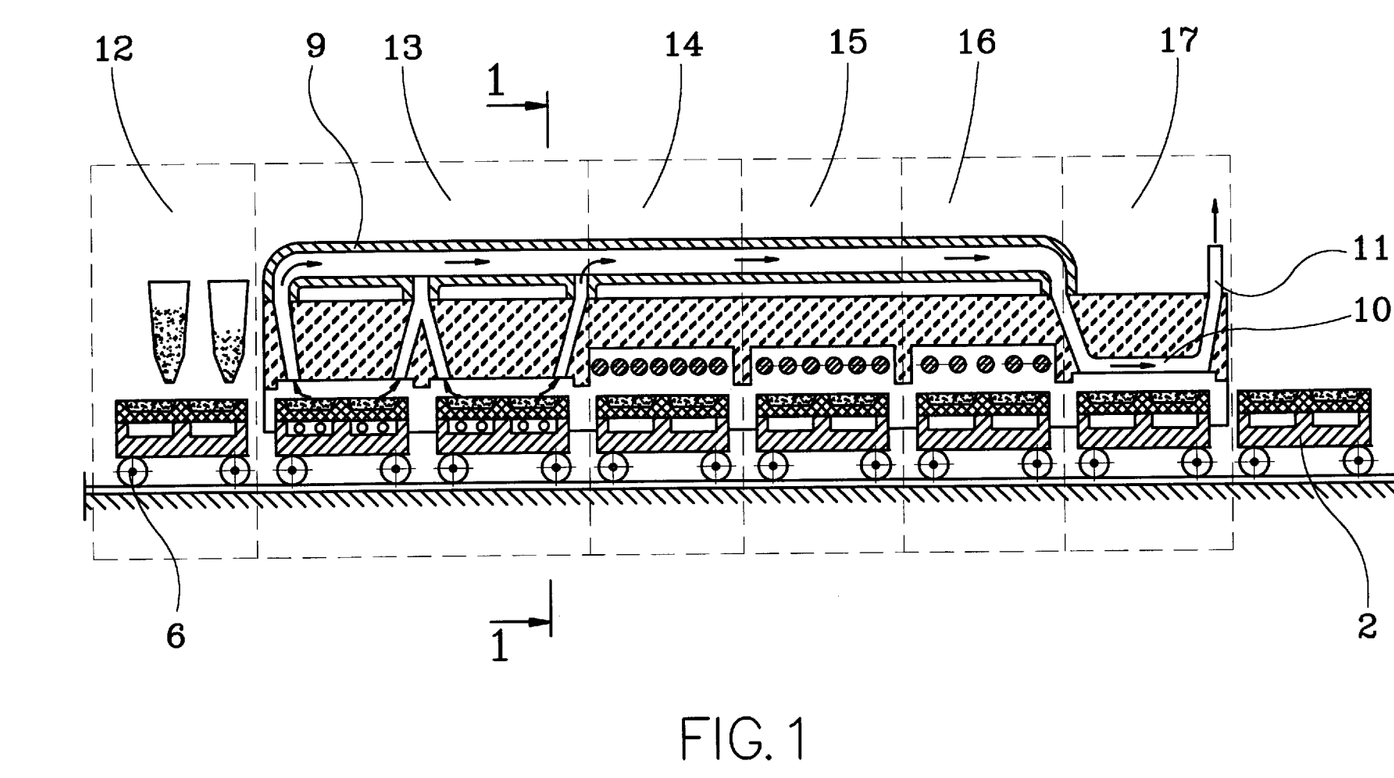
FIG. 1 is a view showing a line of thermal treatment in accordance with the present invention.

With reference to the drawings, FIG. 1 shows a line of a thermal treatment which includes modules for loading of raw material 12, for preliminary lower heating 13, for accelerated heating of a blank surface 14, for thermal shock 15, for adjustable heating and annealing 16, and for a final cooling 17. The modules of the preliminary heating and final cooling are connected by a gas pipe 9, wherein I is an inlet for hot gasses from chambers of the preliminary heating, and II is an exit of gasses after their passage in a ceiling of the chamber for the final cooling. The mold with the initial blanks 2 is transported along the line on movable trolleys 6.

Figure 2:
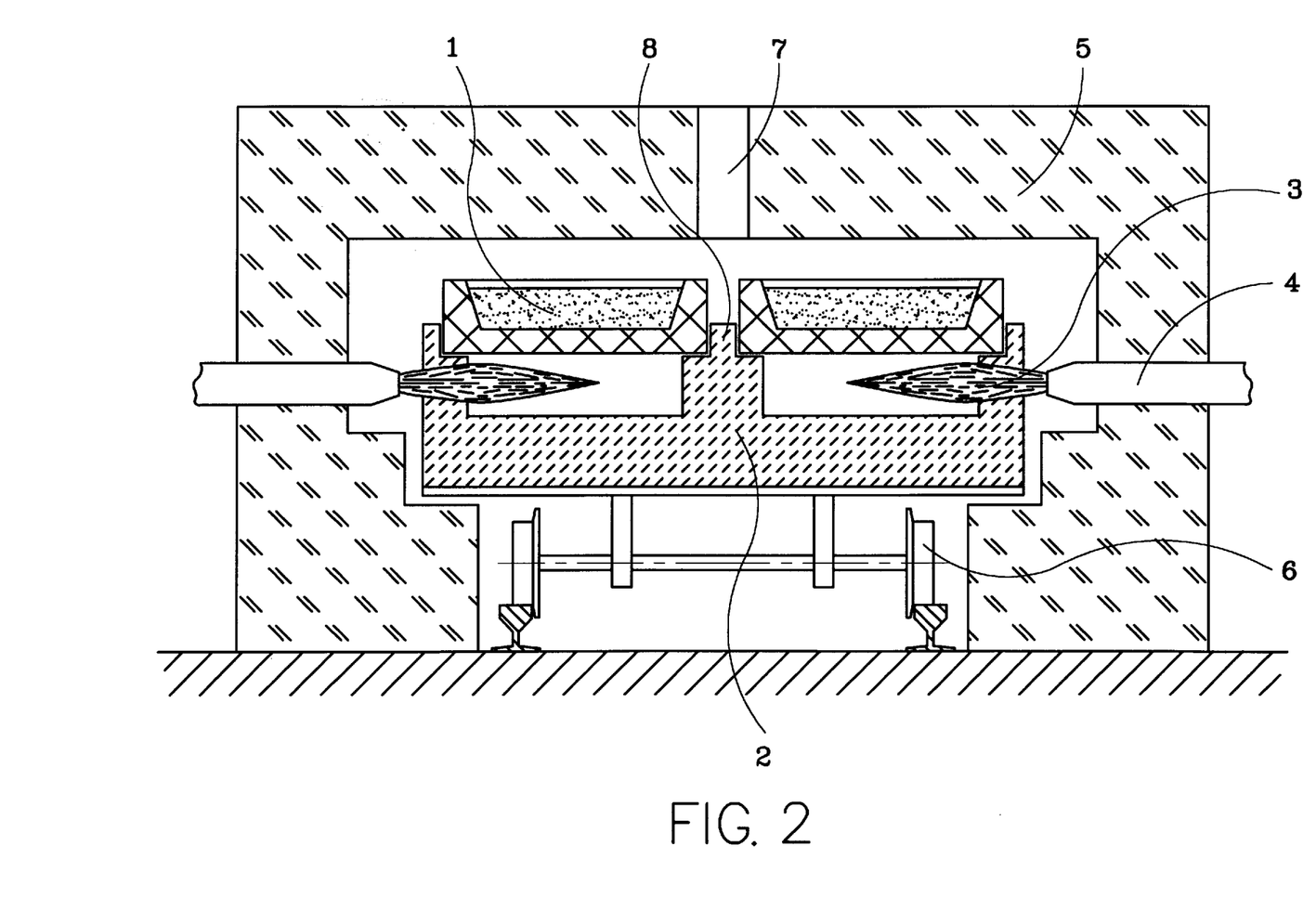
FIG. 2 is a view showing a chamber for a preliminary heating.

FIG. 2 shows a chamber for the preliminary heating. The initial material in heat resistant molds 1 is arranged on a special support 2'. A flame 3 from burners 4 is located under the bottom of the mold. The support with the mold is arranged on the movable trolley 6 inside a heat insulating casing 5, whose ceiling has passages for withdrawal of gasses 7. The mold on the support is held by spacer projections 8.

Figure 3:
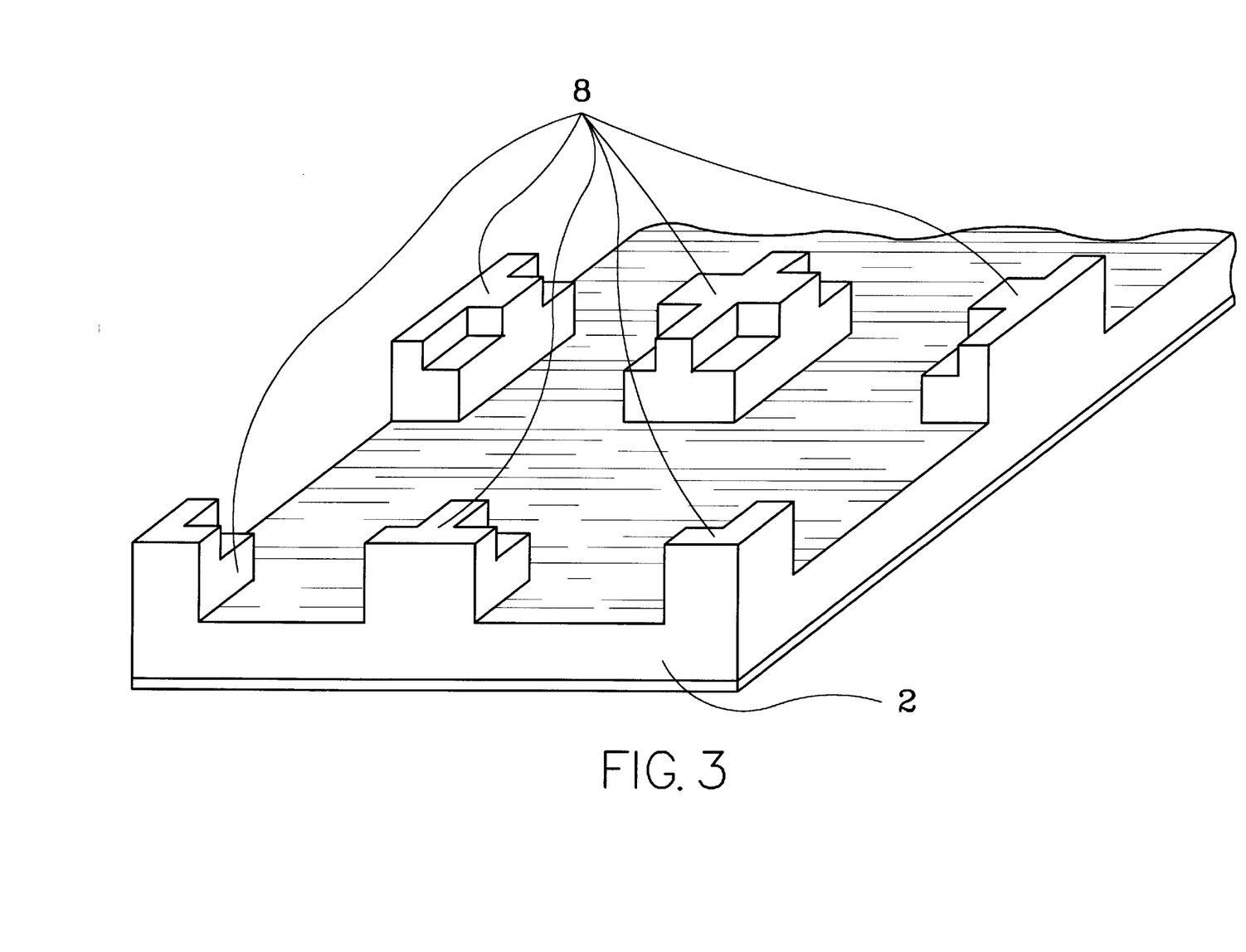
FIG. 3 is a view showing a support for molds with an initial material.
Figure 3A:
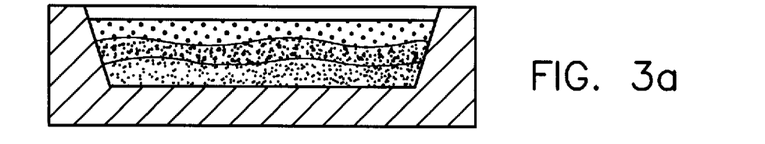
FIG. 3a schematically shows a heat resistant mold.
Figure 3B:
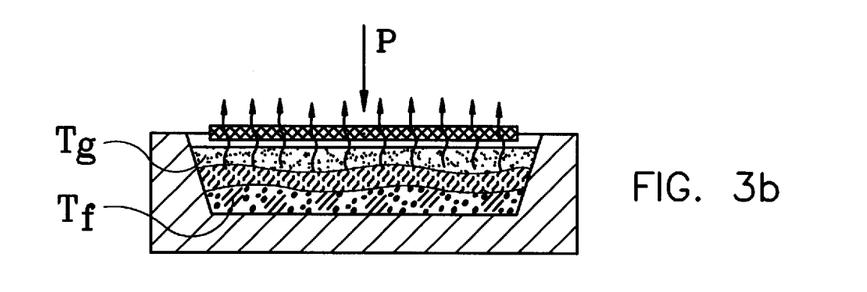
FIG. 3b is a view showing the mold during another stage of the method.

FIG. 3 shows the support for molds with initial material. The support includes a bottom 2 and projections 8 which are shaped in correspondence with the sizes of the used molds. The heat resistant mold is schematically shown in FIG. 3a together with a three-layer initial blank. The mold in FIG. 3b is illustrated in a moment when in the upper layer a temperature of transformation $T_g$ is reached, while in the lower layer a temperature of the beginning of sintering $T_f$ is reached, and pressing is performed by a gas-tight press which is provided with micro passages for withdrawal of gasses from the lower layers of the blank as shown by arrows.

Figure 3C:
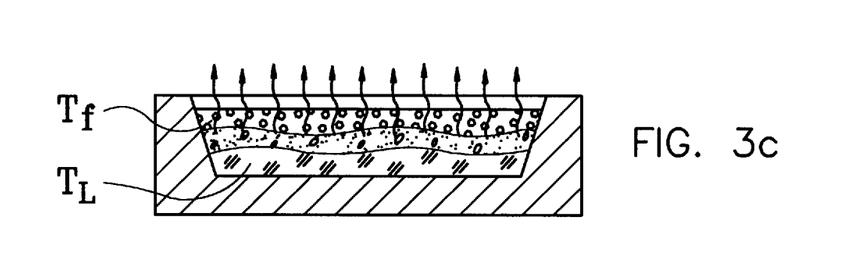
FIG. 3c schematically shows a further thermal treatment stage.
Figure 3D:
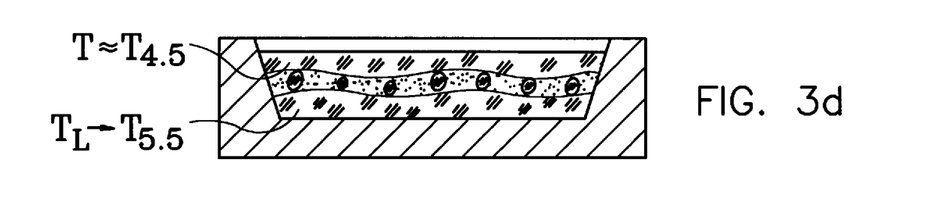
FIG. 3d shows still another thermal treatment stage.
Figure 3E:
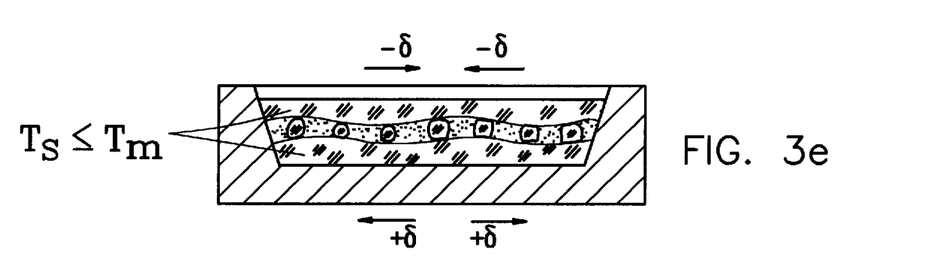
FIG. 3e shows a cooling stage of the inventive method.

FIG. 3c shows the stage of thermal treatment when in the lower layer the Littleton temperature of $T_n$ is reached. Melting of the layer occurs and the remaining gasses are expelled through loose upper layer. FIG. 3d shows a stage when on the surface a maximum temperature of thermal treatment is obtained, the surface is melted, and a structure of the final product is formed. FIG. 3e illustrates a stage of cooling of the product. The temperature of the upper and lower layers $T_s$ is lower than the temperature of the middle layer $T_m$, and the thermal expansion coefficient of the upper layer is minimal. During this stage thermal stresses of compression ($-\delta$) are generated, to provide its strength.

Figure 4:
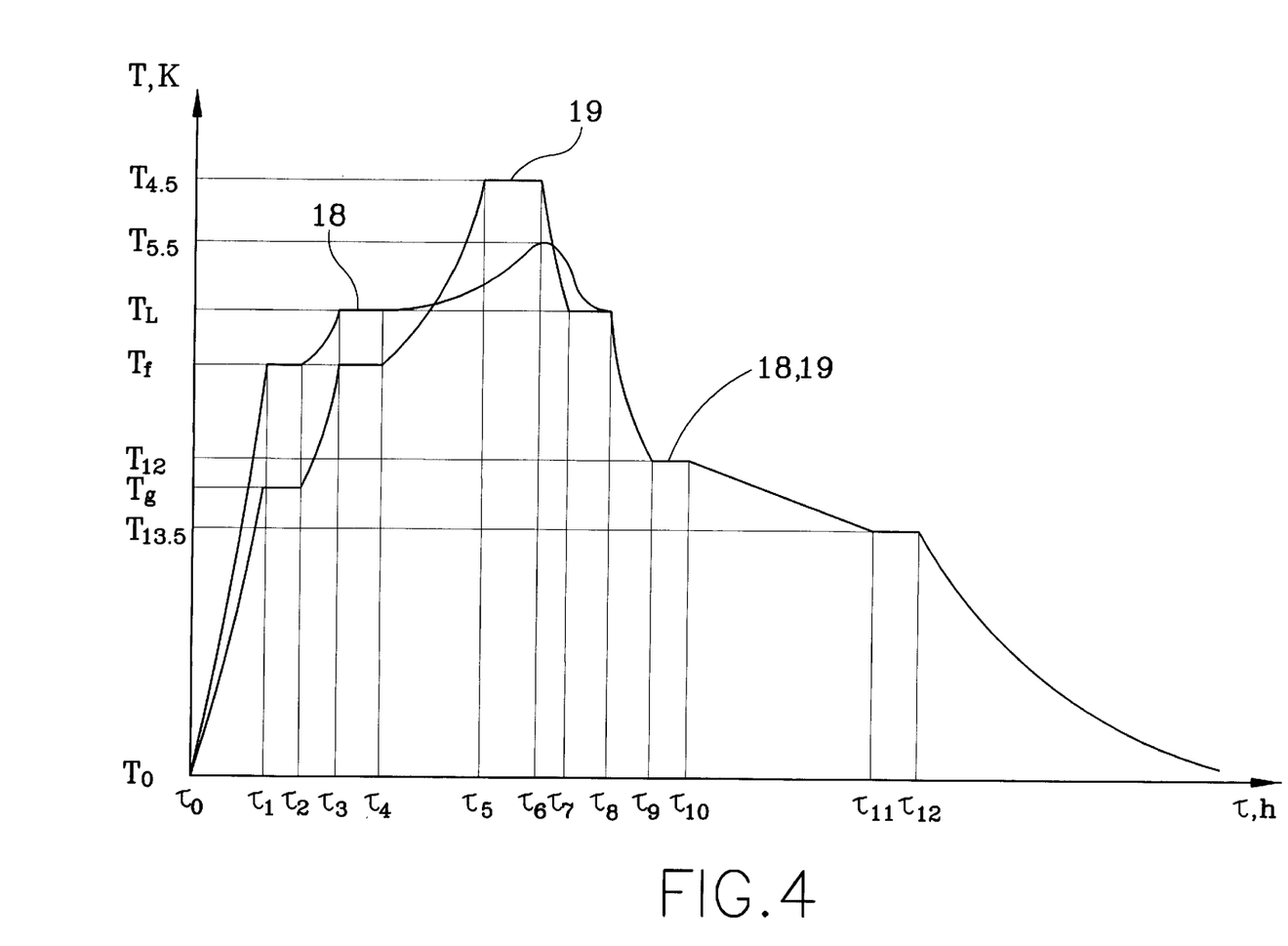
FIG. 4 is a view schematically showing a thermal treatment of blank layers.
Figure 5:
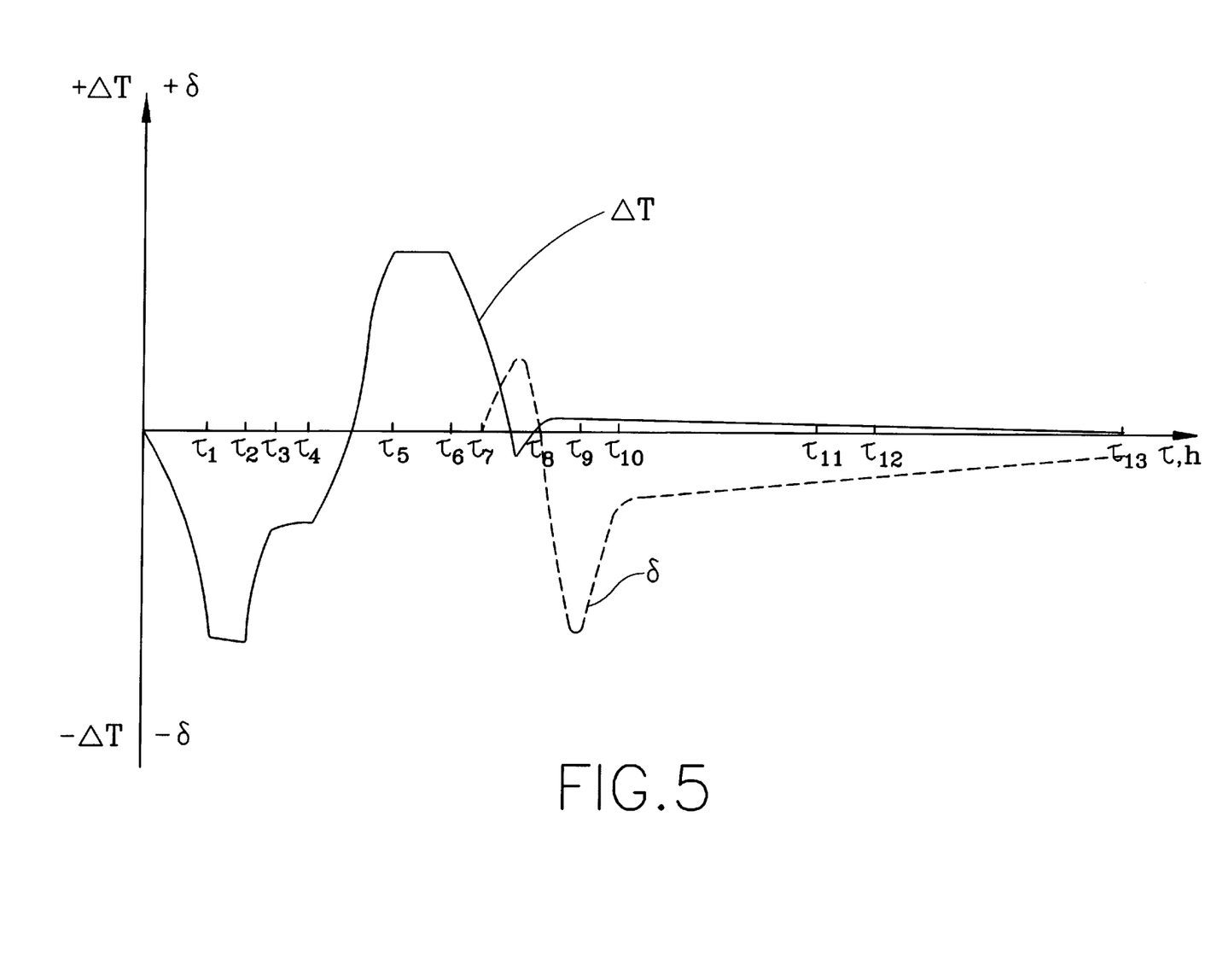
FIG. 5 is a view schematically showing values of a temperature gradient.

FIG. 4 schematically shows a mode of thermal treatment of the lower 18 and upper 19 layers of the blank during the time ($\tau_0 \div \tau_{13}$) and when in these layers certain temperatures T are achieved during the subsequent stages. FIG. 5 finally schematically shows the values of the temperature gradient ($\Delta T$) through a thickness of the blank which is thermally treated, as well as values of temperature stresses ($\delta$) in the upper layer during all stages of thermal treatment ($\tau_0 \div \tau_{13}$).

The apparatus operates in the following manner. In the heat resistant mold the initial material is poured in one or several layers, and then the mold is supplied on the immovable trolleys into chambers of preliminary heating, where the blank is heated through the bottom of the mold first until the temperature gradient ($T_f - T_g$) is reached so that an additional pressing of the blank can be performed, and then until the temperature gradient ($T_t - T_f$) is reached and in the lower layer of the blank melting of the raw material occurs. After this, the molds on the trolleys are supplied into the chamber for predominant heating of the surface 15, where an accelerated heating of the upper layer is performed. Then the trolleys are moved into the chamber for holding, with a maximum temperature of thermal treatment 15, where the surface layer obtains a mirror smooth structure, and melting of the lower layers is performed, with lowering of the temperature to $T_l$. Then the trolley with the molds are moved into the chamber of the first annealing 16 where the holding is performed at the upper temperature of annealing ($T_{12}$), with linear lowering of the temperature to the lower temperature for annealing ($T_{13,5}$), and the second holding at this temperature. After this the trolleys are moved into the chamber of final cooling, whose ceiling is heated to sudden thermal shock (lowering of the temperature) by heated gasses which are supplied from the chambers of the preliminary heating. After cooling to the temperature 150–200° C. the trolleys with final product leave the line and are cooled to room temperature, and then they are removed from the molds.

The present invention has advantages when compared with known methods and apparatus. In the present invention the realization of sintering and melting of initial material from the lower layer of the blank to the upper layer makes possible complete expelling of all gasses which are present in the initial condition as well as gasses which are formed during a thermal treatment as a result of chemical reaction. Therefore it is possible to obtain an article with a dense inner structure which is free of such defects as microbubbles, and has a bending strength not less than 30 MPa. This substantially exceeds the strength of such natural material as granite and marble. In addition, when the multi-layer tiles are produced, due to the corresponding selection of heat expansion coefficient of the lower and upper layers, in the upper layer thermal compression stresses are provided, which makes the article even more strong. The utilization during the thermal treatment of replacement of cations Na and K cations with $L_i$ cations permits to obtain articles with the bending strength more than 50–70 MPa, which makes possible the use of this tile for example for highly loaded floors of industrial spaces.

The present invention is illustrated by the Examples presented hereinabove.

EXAMPLE 1

Crystal glass waste which contains 24% PbO in the form of scrap glass of together with silicate sand as used in glass making with particle size 0.3 to 0.5 mm. The scrap glass is preliminary crushed to get granules of maximum particle size 2 to 3 mm. The input granulate made in the above way is distributed to hoppers (12). In one of the hoppers a mixture of the granulate and silicate sand is prepared to be poured as the lower layer with the ratio of 7 to 9 weight parts of granulate to 3 to 1 weight parts of silicate sand. In other bunker a granulate of different colors is mixed to be used for pouring the upper, decorative layer. The lower layer is poured and water is added to form a lower having a thickness of 8 to 10 mm into a heat-proof mold installed on a mobile trolley, which is followed by pouring the upper layer to the thickness of 3 to 4 mm. The moisture content does not exceed 4 to 5%. The mobile trolley with the blank prepared in this way i.e. poured into the heat-proof mold proceeds to a multi-chamber oven for heat treatment wherein it is moved in 20-minute steps through heating and cooling modules arranged in series. In the first chambers the blank is preliminary heated mostly by heating the bottom part of the mold by gas flame cone for 10 minutes to reach the temperature of approx. 600° C. in the lower layer corresponding to the sintering temperature of scrap of glass i.e. to the viscosity logarithm approx. 9 Pa.s, while the upper layer temperature reaches approx. 450° C., which corresponds to the transformation temperature i.e. viscosity logarithm approx. 12 Pa.s. Then there is a 10-minute holding period (dwell) on the temperatures i.e. with the temperature gradient 150° C. over the blank thickness. During the holding period the lower layer is consolidated because of its sintering, and gas impurities are released due to the rising lifting force (lower layers are hotter) from inter-granule space through the upper layer into the oven, and are removed through gas discharge channels in the chamber roof. In the next stage the lower layer temperature is increased to the Littleton temperature—in our case 750° C., and the upper layer temperature to 700° C. in 10 minutes, which is followed by a the second 10-minute holding period on heating. During the holding period the lower layer mixture at the Littleton temperature is consolidated, for the glass granulate is melted and, because of its own weight, evenly distributed in bottom part of the mold, forcing out the rest of the gases in the upper layer simultaneously. At the same time, the glass granulate has not been fully melted in the upper layer; there have been pockets between individual granules through which gases are removed into the oven chamber, for the temperature gradient enabling gas release has still been maintained. The gases are then released through the gas discharge channels in the chamber roof. At the next 15-minute stage the blank surface is predominantly heated up to the temperature of 950° C. corresponding to the viscosity logarithm of 4.5 of the selected sort glass, which is followed by a 5-minute holding period, by the end of which the lower layer temperature reaches 800 to 820° C. During the holding period the upper layer melts by its own weight, creating a mirrored glossy surface, and fuses with the lower consolidated and sintered layer forming a monolithic product. Then the upper layer of the blank is quickly cooled down to the Littleton temperature (750° C.) or a bit lower, which is followed by a 15 to 17-minute holding periods to equalize the temperature in the tile thickness, which is necessary to prevent its deformation due to uneven temperature field. Then, in 15 minutes the whole tile is rapidly cooled down to the temperature of 475° C. that corresponds to the high annealing temperature, which is followed by 5-minute holding period on the temperature to equalize the temperature along the product thickness, to avoid a temperature could arise again and to remove temperature stress. After the holding period, in 30 minutes the temperature is decreased linearly to 435° C. corresponding to the low annealing temperature, while the speed of temperature decrease is constant and equal to approx. 1.3° C. per minute. Then there is a 10-minute holding period, and then the product is finally cooled down with speed of 10 to 12° C. per minute to room temperature. The final product is removed from the mold after it is cooled.

EXAMPLE 2

The example applies to making high-strength tiles with increased surface layer hardness. We are using the bottle glass scrap as a starting material. The starting material is prepared for pouring into the heat-proof mold in the way analogous to Example 1, with the difference that metal oxides are added to the glass granulate to provide the upper layer with decorative properties. In the given particular example, 0.5 to 1% $Cr_2O_3$; 1.5% $Fe_3O_4$ and 8 to 10% $Mn_2O_3$ are added in the form of fine-dispersed powders to obtain green-black malachite imitating surface, and the granulate is mixed in such a way that the coloring agents are evenly distributed throughout the volume. Then the lower layer is formed by pouring the mixture of glass granulate and silicate sand to a thickness of 7 to 8 mm, which is followed by 3 to 4 mm upper layer consisting of not uniformly mixed mixture of glass granulate and oxides. The heat treatment step is set for 30 minutes in the oven. The initial heating is performed for 20 minutes to achieve the lower layer temperature of 755 to 760° C. (log≅8.5), and the upper layer temperature 580 to 590° C. (log≅12). After 10-minute holding period on these temperatures the blank is heated for 25 minutes to achieve the lower and upper layer temperature of 820° C. and 760 to 770° C. respectively. Then the second holding period is made for 5 minutes, during which the blank is pressed with a gas-permeable press having also the temperature of 760 to 770° C. The pressing consolidates the lower layer, while a definite surface relief may be formed on the upper layer. Then, a thermal shock is applied by heating the surface up to a temperature of 970 to 1010° C. in 3 to 5 minutes, while the lower layer temperature reaches the value of 900 to 950° C. with maintaining the surface relief, which only becomes smoother. The thermal shock is followed by rapid cooling to a temperature of 820° C. in 2 to 3 minutes with 15 to 25-minute holding period at this temperature to equalize the temperature along the blank thickness. Then a second cooling to a temperature of 580° C. (high annealing temperature) in 15 minutes is applied. During the cooling the tile surface is treated with a reagent containing $Li^+$ cations (e.g. $Li_2SO_4$), which results in replacement of $Na^+$ and $K^+$ cations with $Li^+$ cation that has smaller radius and higher field intensity. The surface layer modified in such a way acquires a lower thermal expansion coefficient, and, on further cooling, compressive stresses—a hardened surface layer—are created in it. Further heat treatment is performed as in Example 1 in the following mode:

5-minute holding period with a temperature of 580° C.; linear cooling to a temperature 540° C. in 40 minutes; 10-minute holding period with a temperature of 540° C., and cooling to room temperature with a speed of 8 to 10° C. a minute. After the cooling, the finished product is removed from the mold. The resulting product has a solid internal structure with a hardened surface layer. The bending strength of such a product is at least 35 to 40 MPa, and the surface layer hardness is increased by 1 to 2 units (Moos) compared with the surface hardness of the starting glass.

We claim:
1. A method of making glass-silicate tiles comprising the steps of:
 (a) pouring an input raw material containing glass granulate into a heat-proof mold, wetting the input raw material and making an initial blank thereby;
 (b) heat treating of the blank in the heat-proof mold by gradual heating and by gradual cooling by stages with holding period between the stages wherein:
  (i) a first heating stage is performed predominantly by heating a bottom side of the blank with higher speed of heating of a lower layer than of an upper layer of the blank to accelerate gases to release through the upper layer and to reach the temperature of beginning of glass granulate sintering ($T_f$) in the lower layer, and the temperature not exceeding a glass granulate transformation temperature ($T_g$) in the upper layer,

(ii) a first holding period at these conditions to expel generated gases, and (iii) heating the upper layer with higher speed than the lower layer until a Littleton temperature is reached in the lower layer.

2. The method of claim 1 wherein a temperature gradient equal to the temperature difference between the lower and upper layer being maintained within 150–300° C. for the first holding period ($\Delta T = T_f - T_g$).

3. The method of claim 1 wherein a second holding period being done after achievement of the Littleton temperature in the lower layer and the sintering temperature in the upper layer during which a temperature gradient is maintained on the level that equals to the temperature difference between the lower and upper surfaces within 30 to 70° C. ($\Delta T = T_L - T_f$).

4. The method of claim 3 wherein the blank is pressed from above by a gas permeable unit with a surface temperature of said unit equal to the temperature of the upper layer surface in the period of the second holding period.

5. The method of claim 3 wherein an additional blank heating being performed after the second holding period until the upper layer temperature reaches $T_{max}$ corresponding to a glass granulate viscosity logarithm $4 \pm 1.5^{0.5}$ Pa.s on which a third holding period is made until the lower layer reaches the temperature on which the glass granulate logarithm is equal to $5 \pm 0.5$ Pa.s, after which the stage-by-stage cooling process begins.

6. The method of claim 5 wherein a first cooling stage being performed until temperature $T_L$ is reached on the blank surface, and the first holding period is realized on cooling until the lower layer reaches the same temperature $T_L$.

7. The method of claim 6 wherein a second stage—cooling—is realized after the first stage—holding period—until the high annealing temperature $T_{12}$ is reached, on which the glass granulate viscosity logarithm is equal to 12 Pa.s on which the second stage of holding period is realized for product annealing.

8. The method of claim 7 wherein a third stage of cooling is realized after the annealing to the low annealing temperature $T_{13.5}$ on which the glass granulate viscosity logarithm is equal to 13.5 Pa.s, after which the third stage of holding period is realized with the temperature to remove a residual thermal stress, while the product is cooled down to a room temperature after the second annealing.

9. The method of claim 8 wherein the third cooling stage is performed in conditions of linear tile temperature decreasing in time.

10. The method of claim 7 further comprising an additional holding period before the second stage holding period between the Littleton and a high annealing temperatures, when the blank surface is treated by a reagent containing cations of lithium.

11. The method of claim 1 wherein the blank is made of three poured layers: a lower layer of granulated scrap glass thick 3 to 4 mm with maximum size of the granules 2 to 3 mm; the second one consisting of a mixture of silicate material and granules of window scrap glass; and the upper layer which is the mixture of colorless ad colored glass granulate thick 3 to 5 mm.

12. The method of claim 11 wherein coloring metal oxides are added in the upper layer.

13. The method of claim 1 wherein the blank is made of two poured layers: the lower layer comprising of the mixture of fine-dispersed silicate material and scrap glass, and the upper layer comprising glass granulate, while the silicate material temperature does not reach the silicate material melting or softening temperature in the lower layer in course of heating.

14. The method of claim 1 wherein the blank is made of a single layer of poured glass granulate of required thickness.

15. The method of claim 1 wherein the blank is made of three poured layers: the lower and upper layers of glass granulate of an identical composition, and the middle layer of the glass granulate of different composition which thermal expansion coefficient is higher than the thermal expansion coefficient of both the upper and lower layers.

16. The method of claim 1 wherein the blank is formed by three layers: the lower and upper layers of glass granulate of identical composition, and the medium layer of glass granulate which Littleton temperature is lower than the Littleton temperature of the upper and lower layers.

17. The method of claim 1 wherein 3 to 7% (by weight) of water glass is added additionally into the blank which is then blown with carbon dioxide with the temperature 150 to 200° C.

18. A method of making the glass-silicate tiles comprising:

(a) creating of an initial blank by pouring an initial raw material containing glass granulate into a heat-proof mold and its consolidating;

(b) gradual heating the blank in the heat-proof mold with holding periods between stages comprising following stages: a first stage of heating, predominantly from bottom of the blank with lower layer heating temperature higher than the temperature of upper layer to accelerate gas removal through the upper surface layer until a glass granulate sintering temperature is reached in the lower layer, a first holding period at these conditions to expel generated gases, heating the upper layer with higher speed than the lower layer until a Littleton temperature is reached in the lower layer and sintering temperature is reached in the upper layer and having a second holding period with these conditions, during the second holding period pressing the blank by a gas permeable press, after which additionally heating the blank until the upper layer reaches a temperature $T_{4.5}$ corresponding to 4.5 Pa.s, under which the third holding period is realized until the lower layer reaches a temperature $T_{5.5}$ on which a glass granulate viscosity logarithm is equal to 5.5 Pa.s;

(c) after the third holding period the blank is cooled in the heat-proof mold with holding periods between following stages: a first stage of accelerated cooling is realized until the blank surface reaches a temperature $T_L$, which is followed by a holding period for the period of time sufficient to achieve the Littleton temperature in the lower layer; after the first holding period a second cooling stage is performed until the annealing temperature is reached, after which a second holding period ensures a product annealing; after the first annealing a third cooling stage is realized until the surface reaches a temperature $T_{13.5}$ on which the melt viscosity logarithm is equal to 13.5 Pa.s, after which the product is annealed, and, after the second annealing, cooled down to the room temperature.

19. The method of claim 18 wherein the blank is formed by three poured layers: the lower layer containing the granulated window glass scrap thick 3 to 4 mm with maximum size of granules 2 to 3 mm, the middle layer consisting of the mixture of silicate material and granulated glass scrap, and the upper layer which is a mixture of window or bottle and colored glass thick 3 to 5 mm.

20. The method of claim 19 wherein coloring metal oxides are added into the upper layer.

21. The method of claim 19 wherein fine-dispersed sand is used as the silicate material.

22. The method of claim 18 wherein the blank is made of two poured layers: the lower layer comprising a mixture of fine-dispersed silicate material and scrap glass of different composition, and the upper layer comprising the glass granulate, while the lower layer silicate material temperature does not reach the melting or softening temperature in course of heating.

23. The method of claim 18 wherein the blank is formed by a single layer of poured glass granulate of required thickness.

24. The method of claim 18 wherein the blank is formed by three poured layers: the lower and upper layers of the same composition, and the middle layer of glass granulate of other composition which thermal expansion coefficient is higher than the thermal expansion coefficient of the upper and lower layers.

25. The method of claim 18 wherein the blank is formed by three poured layers: the lower and upper layers of glass granulate of any composition, and the middle layer of glass granulate which Littleton temperature is lower than the Littleton temperature of the upper and lower layers.

26. The method of claim 18 wherein 3 to 7% (by weight) of water glass is added in the blank, and the blank is blown with carbon dioxide with temperature 150 to 200° C. after pressing.

27. The method of claim 18 wherein there is an additional holding period in the cooling stage between the Littleton temperature and high annealing temperature, when the blank surface is treated by a reagent containing cations of lithium.

* * * * *